United States Patent [19]

Scher et al.

[11] Patent Number: 5,260,006
[45] Date of Patent: Nov. 9, 1993

[54] METHOD AND APPARATUS FOR CONTINUOUS CASTING OF POLYMERIZABLE THERMOSETTING MATERIAL

[75] Inventors: Herbert I. Scher, Pikesville; Israel S. Ungar, Randallstown; Richard R. Baehr, Jr., Annapolis, all of Md.

[73] Assignee: Nevamar Corporation, Odenton, Md.

[21] Appl. No.: 799,740

[22] Filed: Nov. 22, 1991

Related U.S. Application Data

[63] Continuation of Ser. No. 468,921, Jan. 23, 1990, abandoned.

[51] Int. Cl.$^5$ .............................. B29C 35/10
[52] U.S. Cl. ..................... 264/26; 264/148; 264/216; 264/236; 264/347; 264/85; 264/166; 425/174.4; 425/174.8 R; 425/224
[58] Field of Search ............. 264/22, 25, 26, 85, 264/331.18, 148, 166, 216, 236, 347; 425/224, 174.4, 174.8 R

[56] References Cited

U.S. PATENT DOCUMENTS

| | | | |
|---|---|---|---|
| 2,136,422 | 11/1938 | Fields | 264/331.18 |
| 2,379,248 | 6/1945 | Muskat . | |
| 2,603,741 | 7/1952 | Seifried et al. | 264/347 |
| 2,663,908 | 12/1953 | Maier et al. . | |
| 3,049,761 | 8/1962 | Yakubik . | |
| 3,091,811 | 6/1963 | Hackert . | |
| 3,488,246 | 1/1970 | Duggins . | |
| 3,528,131 | 9/1970 | Duggins . | |
| 3,529,325 | 9/1970 | Duggins . | |
| 3,592,882 | 7/1971 | Morita | 264/236 |
| 3,600,490 | 8/1971 | Billingsley et al. . | |
| 3,801,407 | 4/1974 | Goldsworthy et al. . | |
| 3,821,337 | 6/1974 | Bunclark et al. . | |
| 3,872,197 | 3/1975 | Kato et al. | 264/166 |
| 3,894,826 | 7/1975 | Kato . | |
| 3,906,068 | 9/1975 | Hanusa . | |
| 3,923,941 | 12/1975 | Weaver . | |
| 3,978,178 | 8/1976 | Oshima et al. | 264/166 |
| 3,988,098 | 10/1976 | Kato et al. . | |
| 4,001,368 | 1/1977 | Michizoe et al. . | |
| 4,018,642 | 4/1977 | Pike et al. . | |
| 4,133,861 | 1/1979 | Kato . | |
| 4,186,044 | 1/1980 | Bradley et al. . | |
| 4,221,253 | 9/1980 | Seiberling . | |
| 4,298,413 | 11/1981 | Teare . | |
| 4,314,036 | 2/1982 | Throne et al. . | |
| 4,404,003 | 9/1983 | Harris . | |
| 4,425,287 | 1/1984 | Hesse et al. . | |
| 4,626,187 | 12/1986 | Kamada | 264/347 |
| 4,710,333 | 12/1987 | Murakami et al. | 264/216 |
| 4,839,125 | 6/1989 | Ida | 264/216 |

FOREIGN PATENT DOCUMENTS

| | | |
|---|---|---|
| 0036819 | 9/1981 | European Pat. Off. . |
| 0246806 | 11/1987 | European Pat. Off. . |
| 3543266 | 6/1986 | Fed. Rep. of Germany . |
| 1491437 | 7/1967 | France . |
| 1497702 | 9/1967 | France . |
| 49-99163 | 9/1974 | Japan . |
| 53-140362 | 12/1978 | Japan . |

Primary Examiner—Jeffery Thurlow
Attorney, Agent, or Firm—Jones, Day, Reavis & Pogue

[57] ABSTRACT

A method and apparatus for continuous casting of polymerizable thermosetting materials comprises mixing the materials with controlled amounts of two or more catalyst groups and passing said mixture through two or more series of heating stages. The initially gelled mixture which has not yet undergone excessive shrinkage is mechanically isolated from the ungelled mixture.

19 Claims, 4 Drawing Sheets

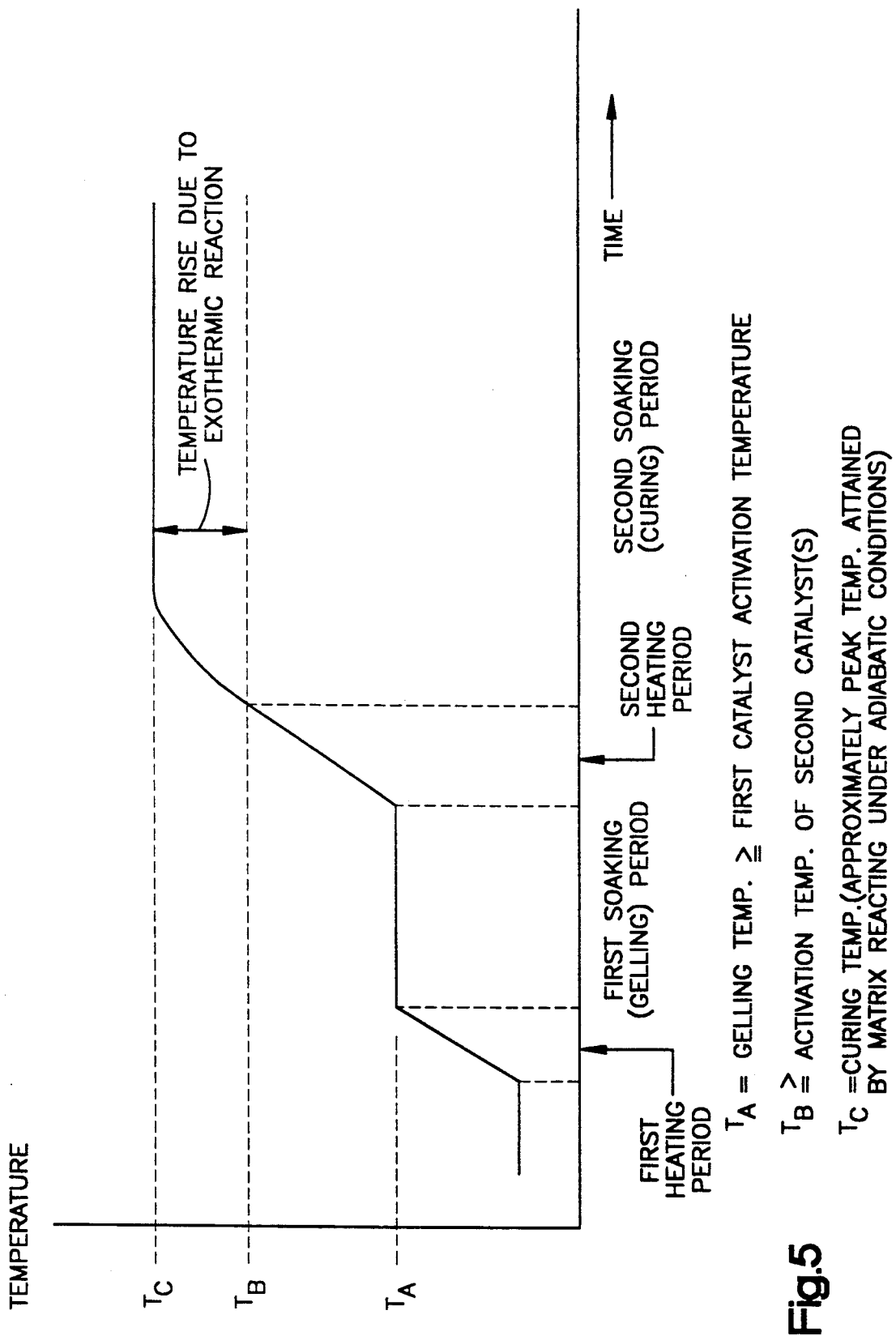

METHOD AND APPARATUS FOR CONTINUOUS CASTING OF POLYMERIZABLE THERMOSETTING MATERIAL

This application is a continuation of application Ser. No. 07/468,921, filed Jan. 23, 1990, now abandoned.

BACKGROUND OF THE INVENTION

I. Field of the Invention

The present invention relates to a new method and apparatus for continuously casting certain thick sheet materials sometimes used as surface overly, but which also can be used, without underlay, such as for a stand-alone restaurant table top. More particularly, the present invention relates to a new method and apparatus for continuously casting polymeric thermosetting materials which shrink during polymerization.

II. Description of the Prior Art

Thermosetting polymeric materials such as thermosetting resins are commonly used as surface covering materials. Sheets of these materials are used as decorative finishing materials in new building construction and remodeling for such applications as bathroom vanity tops, kitchen counter tops, furniture components, restaurant tables, wall paneling and other uses. The sheets can be made of plain solid colors or can be patterned to have the appearance of marble, granite or other patterns or textural decoration and often are loaded with decorative particles to provide these characteristics. The resin composition typically includes mineral fillers such as calcium carbonate or aluminum trihydrate. It is preferred that the pattern in these materials be uniformly distributed and that the final product be flat, smooth and free of warpage, bends or wrinkles. It is also preferred that a flat surface be obtained with the minimum of sanding or machining.

The composition of these materials typically can be a single thermosetting resin or a mixture of resins such as unsaturated polyesters and acrylic resin precursors. Such resins require a catalyst and/or promoter system to initiate the process of free radical polymerization. Typical resins are characterized by having a significant exothermic reaction during polymerization and a substantial increase of density during that process. Thus, a typical mixture of 65% filler and 35% resin (a "matrix") shrinks during the polymerization process so that the cured solid composition has a density about 5-7% higher than the liquid matrix. This shrinkage presents processing problems related to the present invention which are discussed below.

A variety of prior methods have been used to achieve synthetic sheet materials having a decorative pattern. One method involves a batch process. In this process, the matrix is prepared by mixing the thermosetting resins with the filler and the desired decorative particles or coloring materials and a standard quantity of catalyst. The amount of catalyst typically recommended in the prior art is one half to two percent based on the liquid resin fraction. This matrix is then poured or pumped into a large casting mold and sealed in the mold. The mold is then subjected to sufficient heat to begin decomposition of the catalyst, which initiates polymerization of the resin. Because the polymerization is an exothermic process, the reaction contributes to the heat of the system leading to further catalyst decomposition and an increased rate of polymerization. This follows the convective heat environment applied to the matrix is warm enough to "kick off" the polymerization reaction which then sustains itself by its own heat of reaction and actually is cooled by dissipating heat back to that environment. This process continues until substantially all of the unsaturated bonds of the resin and monomer components are consumed and the resin is cured. The mold is then opened after cooling and a panel of decorative sheet material is removed. As explained below, the present invention departs from the thermodynamic and many other aspects of this conventional approach.

Such a batch process has significance shortcomings. It is slow and inefficient, requiring a great deal of material handling equipment. It presents significant problems with controlling the matrix uniformity in the mold, particularly where decorative particles are used in the matrix. For example, flow patterns and convection currents in the matrix can result in nonuniformity of the decorative pattern. In addition, such a batch process can present curing problems if the matrix is not heated uniformly and, thus, does not polymerize at the same rate throughout the mold cavity. The result can be localized shrinking which may cause cracks or tears in the final cured material.

Several prior attempts have been made to develop a continuous casting technique as an alternative to the batch process for thermosetting materials which shrink upon curing. U.S. Pat. No. 3,600,490 issued to Billingsley et al, for example, teaches that if the structure cures unevenly, as is usually the case, certain areas of the mass will harden and shrink unevenly, distorting the cast product. To avoid the problem of wrinkling or tearing on the surface of the matrix during shrinking, Billingsley teaches the use of a thin film and lubricant to permit belt of the conveyor. Specifically, Billingsley teaches a process whereby the matrix rests on a layer of a film which shrinks during heating at the same rate as the curing matrix. Billingsley teaches the use of oil or a similar liquid lubricant between the film layer and the conveyor belt. In this approach, the film shrinks with the matrix and the thin film does not hang up on the conveyor belts as it shrinks.

Another continuous casting approach can be found in U.S. Pat. No. 3,988,098 issued to Kato et al. Kato teaches a dual belt system which uses the force of a confined space to control the tendencies of the matrix to distort or tear itself apart during the polymerization process. The matrix is passed through a confined space defined by upper and lower belts which force the matrix to maintain a flat rectangular cross section despite the presence of internal forces brought about by localized curing which would otherwise cause the matrix to pull apart, warp or bend.

From the foregoing it can be seen that the prior art continuous casting processes involve expensive and complicated arrangements to control the curing of the thermosetting material. Prior art casting methods also pose quality problems. In conventional belt casting equipment, the liquid matrix often is heated by the conduction of heat through the belts which are enclosed in an environment of heated fluid or gas. With conventional conductive heating, if the mold or belt surface is too hot, it will cause initiation of a rapid accelerating reaction before curing is complete. This can cause local boiling, or at least, irregular cure with shrinkage stresses, cracking, ripple, craze layers, etc. If the heating is done on a single supporting belt (without a top belt), the bottom of the matrix layer can polymerize before the top, causing severe warp, concave upward. Also, excessive temperature differences between the matrix result in objectional appearance of mottling or streaks. Thus, the use of convection heat and typical belt systems will result in the need to limit the rate of heating, resulting in a long heating time which then requires a higher matrix viscosity, and longer equipment in the case of continuous casting. Problems arise because with the longer heating time, the viscosity of the matrix is reduced for a longer period of time before it rapidly climbs just prior to gelling. This is illustrated in FIG. 3. The lower viscosity for an extended time permits the mineral filler to settle and also any dense particles used for decorative effect may settle, resulting in a non-homogenous sheet both in physical properties and in appearance at a cut edge.

SUMMARY OF THE INVENTION

It is an object of the present invention to provide an efficient and simple method for continuous casting of thermosetting materials which shrink upon curing. It is an object to provide a method which overcomes the problems of particle settlement and surface distortion during the curing process. It is an object to provide a method which will prevent the creation of internal stresses (and the associated problems of warp, curl and cracking.) It is a further objective to provide a method which will avoid the tendency of the shrinking matrix to detach itself due to shrinkage from the liquid matrix at the entry end of the caster.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, the invention provides a method and apparatus for continuous casting of a polymerizable thermosetting material which shrinks upon curing. According to the present invention, the thermosetting composition is mixed using a controlled amount of a first catalyst having a limited activation temperature and a second catalyst having a sufficiently higher activation temperature. The matrix is then deposited in a controlled amount on a single layer web which is traveling on a conveyor or over a fixed support plate. The matrix, which is in a liquid state, is allowed to travel far enough to allow the top surface and edges to become level and smooth. According to the present invention, the matrix is then heated in a first zone to a temperature that initiates decomposition of the catalyst having the limited activation temperature. It has been found in accordance with the present invention that the matrix can be made to partially polymerize to a rubbery gel quickly in the first zone without excessive shrinkage. The gelled matrix is then mechanically isolated from the liquid matrix near the entry end. The gelled and isolated matrix is then heated in a second zone to a higher temperature that initiates decomposition of the second catalyst, which has a sufficiently high activation temperature. According to the present invention, it has been found that the isolated gelled matrix can freely shrink in the second zone without causing wrinkles on the bottom surface and without transmitting stresses to the softer gel formed during the initial gelling in the first zone. According to the invention, substantially adiabatic curing conditions preferably are supplied in the second zone.

The present invention has the benefit of providing an efficient uncomplicated method of continuous casting that avoids the creation of internal stresses. It has the benefit of providing a means to isolate the curing matrix from destructive internal and external forces which tend to produce distortion. It also has the benefit of producing a cured homogeneous matrix with uniform properties and appearance. It also has the benefit of providing individual sheets which shrink uniformly throughout the sheet material, thus avoiding warpage, waviness, or other signs of irregular shrinkage during cure even though no externally applied pressure is provided. Additional advantages and benefits will be apparent to those skilled in the art upon reading this disclosure.

BRIEF DESCRIPTION OF THE DRAWINGS

FIG. 5 is a graph showing an embodiment of the heating sequence according to the present invention.

DETAILED DESCRIPTION OF THE PRESENT INVENTION

Figure 1:
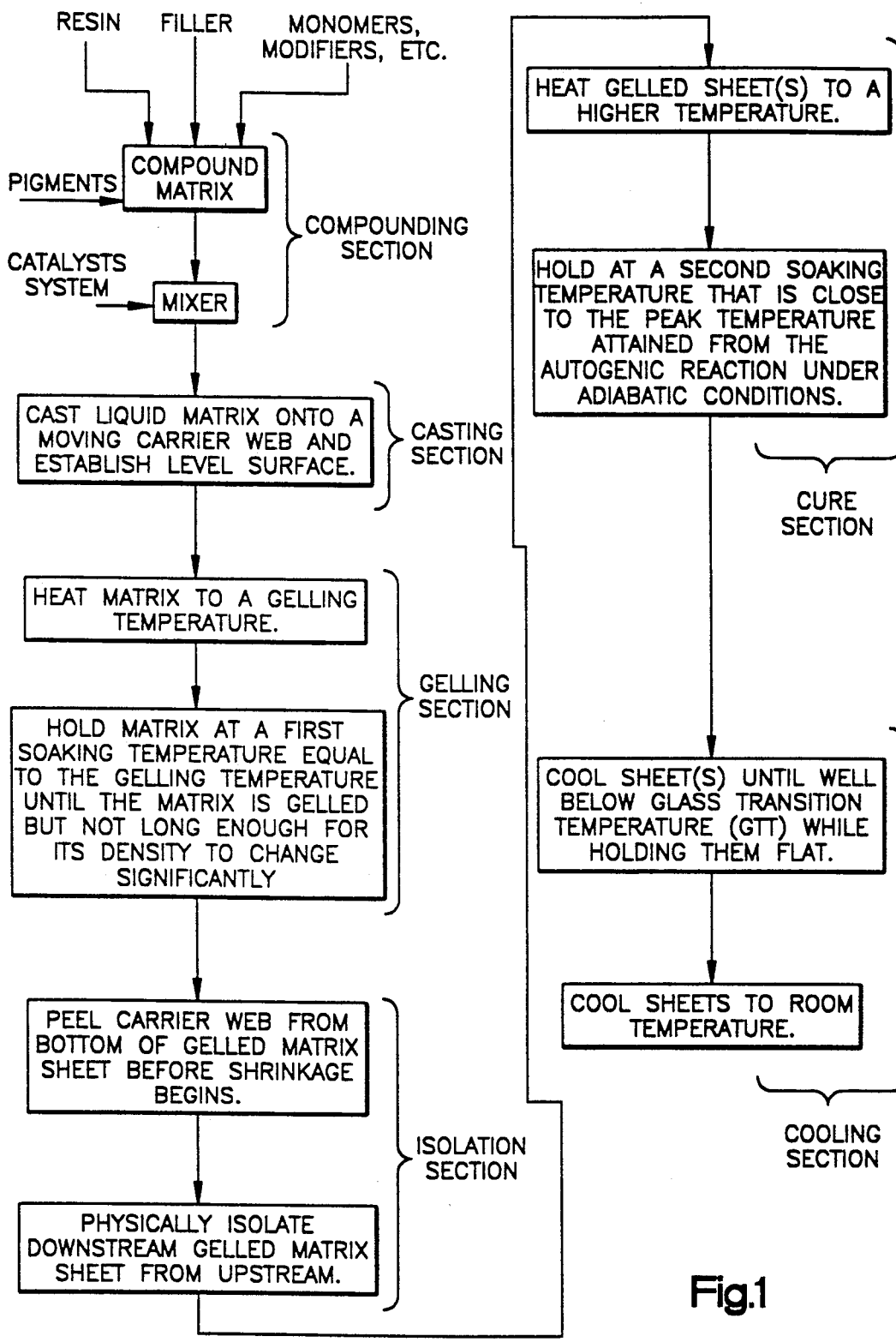
FIG. 1 is a schematic flow illustration which depicts the process steps according to one embodiment of the present invention.

The process steps of the present invention are schematically illustrated in FIG. 1. As shown in FIG. 1, to begin, the matrix is prepared using a mixture of resin, filler and optional monomers, modifiers or other ingredients. The matrix is then prepared for casting with the addition of pigments and catalysts. The decorative sheet material may be made of any thermosetting material having the desired properties of heat resistance, color stability, clarity, chemical and stain resistance, and other physical properties suitable for easy machinability and fabrication in the polymerized form. The present invention is particularly well suited to materials which shrink upon curing. Such thermosetting materials are discussed in greater detail below.

A catalyst system typically consisting of two or more catalyst groups is used. The catalyst groups are selected such that one catalyst group has a limited activation temperature and the remaining catalyst group(s) have a sufficiently higher activation temperature. Typically, each of these groups comprises only a single catalyst but can be made of two or more catalyst in a group. It is critical for performance that the difference in temperature between the lower activation temperature catalyst group and the next higher activation temperature catalyst group must be at least 10 degrees fahrenheit. The preferred difference is at least 30 degrees and, in the preferred embodiment, the difference is at least 50 degrees.

The activation temperature of the first catalyst group should be in the range of 100 to 220 degrees F. The activation temperature of the next higher catalyst group should be in the range of approximately 110 to 280 degrees F. The preferred range for this second group is 150 to 280 degrees F.

A variation on this method uses a single temperature activation of a portion of the catalyst (the first catalyst group), leaving another portion of the catalyst (the second catalyst group) to activate at a sufficiently higher temperature. For purposes of this discussion, any such method which involves catalyst activation at two or more different staged temperatures will be included within the definition of the catalyst system of the present invention.

It is also critical that the amount of the catalyst having the lower activation temperature be limited such that the lower temperature catalyst group will bring about a proper amount of partial polymerization of the matrix. The minimum amount of the lower temperature catalyst group selected is the amount sufficient to cause the matrix to polymerize to a rubbery gel before it has reached the point in the process where the matrix is mechanically isolated from the less polymerized matrix. As on upper limit, the amount of the lower temperature catalyst group should be held below the amount which would cause excessive shrinkage of the matrix before it has reached the point in the process where the matrix is mechanically isolated from the less polymerized matrix. Excessive shrinkage is that amount which, in the case of the given matrix, causes the matrix to form surface wrinkles, residual stresses, warp or, in extreme cases, to tear itself apart. Thus, the quantity of the lower temperature catalyst group preferably is no more than that which is just required to bring about a rubbery gel under the selected first heating conditions. As explained more fully below, it has been found that the matrix may be partially polymerized to the point of creating a solid rubbery material suitable for further processing in accordance with the invention before an excessive amount of shrinkage occurs. The amount of the lower temperature catalyst group, expressed as percent active of catalyst based on the liquid approximately 0.0010 and 0.02 percent gives a conventional matrix composition and oven parameters. The preferred range is between approximately 0.0015 and 0.01. This is discussed in greater detail below.

Returning to FIG. 1, the liquid matrix with the added catalyst system is dispensed in controlled amounts onto a moving carrier web and moved a sufficient distance to establish a level surface. In the next step of the process depicted in FIGS. 1 and 5, the matrix is quickly polymerized to the point where it creates a solid rubbery gel. In the preferred embodiment, this is accomplished by heating the matrix by radio frequency energy to a first temperature (the gelling temperature) and holding the matrix at a soaking temperature equal to that temperature for a predetermined length of time. The first temperature is a temperature sufficient to activate the lower activation temperature catalyst group but not high enough to activate the second catalyst group. The matrix is held at this temperature until the matrix has become a rubbery solid but has not yet had an excessive change in its density. Activation temperature is the temperature at which the catalyst rapidly decomposes in resin and initiates a polymerization reaction.

Next, the matrix is manipulated to isolate the gelling section from the transmission of shrinkage stresses which take place later in the process. As explained below in greater detail, this is done in two steps in the preferred embodiment. First the carrier web is peeled from the bottom of the gelled matrix. Next, the gelled matrix is physically isolated from the upstream matrix. This may be done by a variety of methods such as pinch rollers or, in the preferred embodiment, by cutting the continuous gelled sheet into predetermined lengths using a traveling saw.

The isolated gelled matrix is then heated to a second temperature. The second temperature is sufficient to activate one or more of the remaining catalysts groups and thereby initiate an accelerated polymerization reaction which reaction generates heat. In the preferred embodiment, the matrix is then held at a second soaking temperature approximately equal to the peak temperature obtained from the heat of this second reaction under adiabatic conditions. The matrix is held at this temperature at least until the shrinkage is substantially complete. In the preferred embodiment, it is held at this temperature until the desired polymerization is complete.

Finally, the sheets are held flat and cooled until well below the glass transition temperature of the matrix material. In cooling a relatively thick sheet of plastic composition, unequal shrinkage stress may occur through the cross-section due to the fact that the surface of the sheet must cool before the center. If the cooling is slightly asymmetrical from one face to the other, the sheet can warp or curl during cooling, which warp or curl can be permanent. Thus, during the cooling phase it is preferred to hold the sheets flat until well below the glass transition temperature.

The preferred method of heating is by a radio frequency field. By this method, the liquid matrix can be heated very rapidly without local temperature variations that cause objectional flow patterns. Also, provided hot spots due to interference nodes are eliminated, the upper temperature limit during gelling can be raised without initiating localized premature autogenic reaction. Thus, a short heating section, less restrictions on matrix viscosity, negligible settling of filler, and excellent heating control dynamics are obtained.

Figure 2:
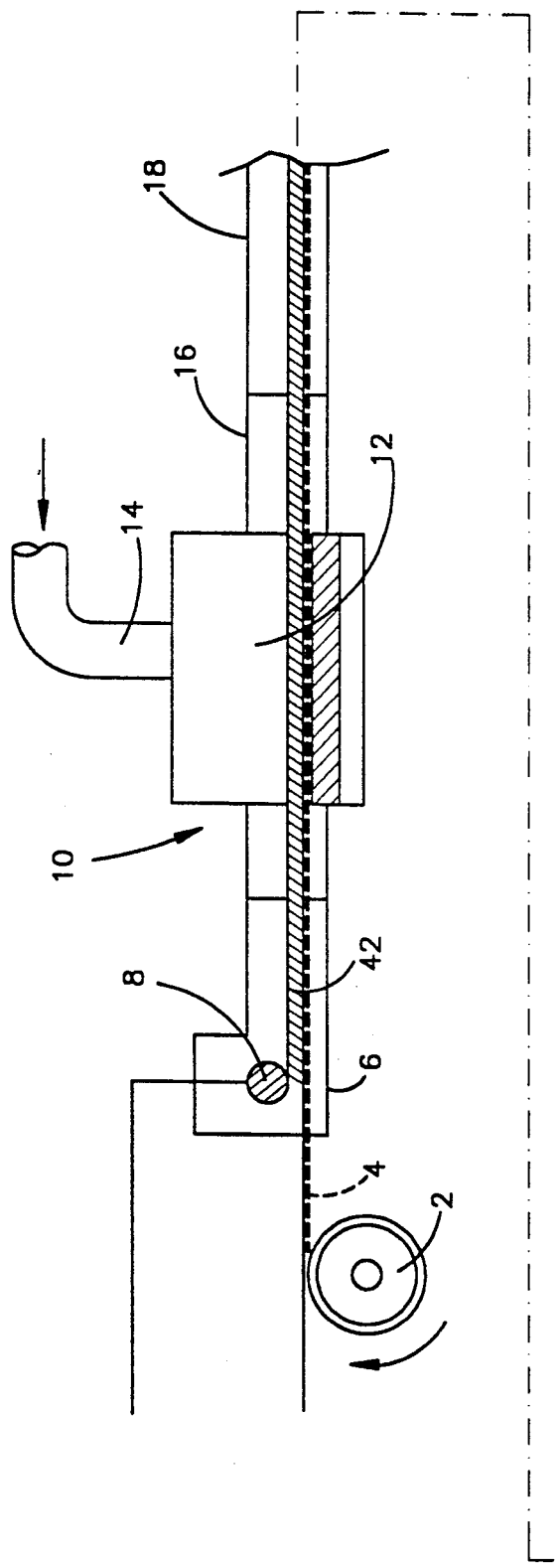
FIG. 2 is a diagramatic side elevational view of one embodiment of an apparatus of the present invention.
Figure 2:
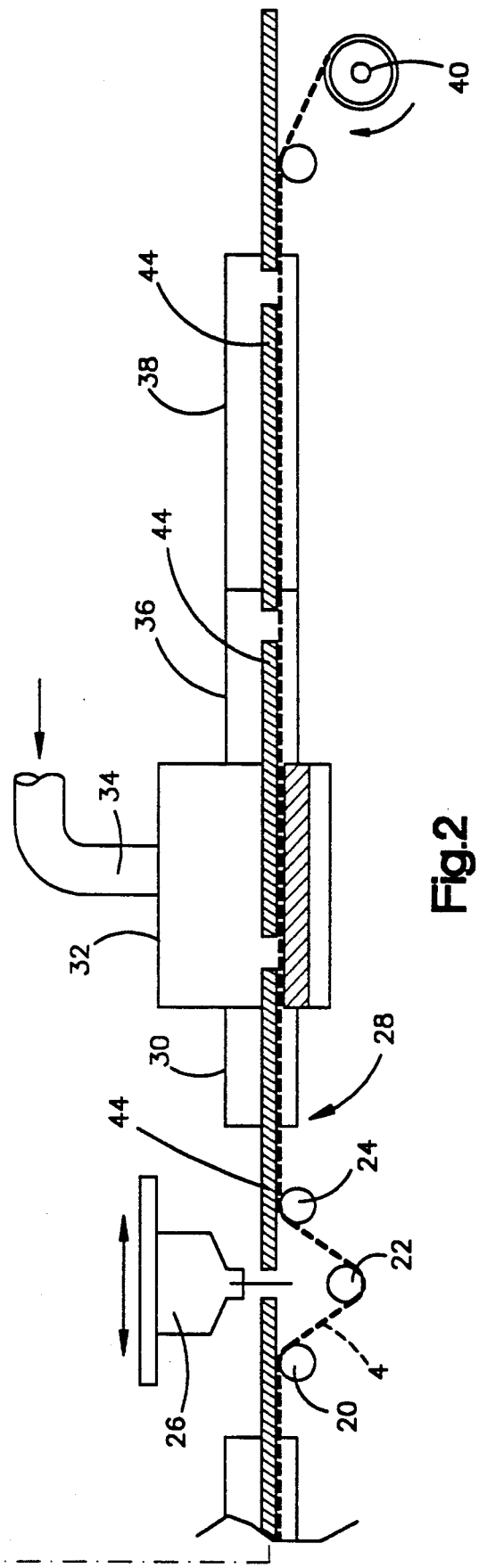
Figure 3:
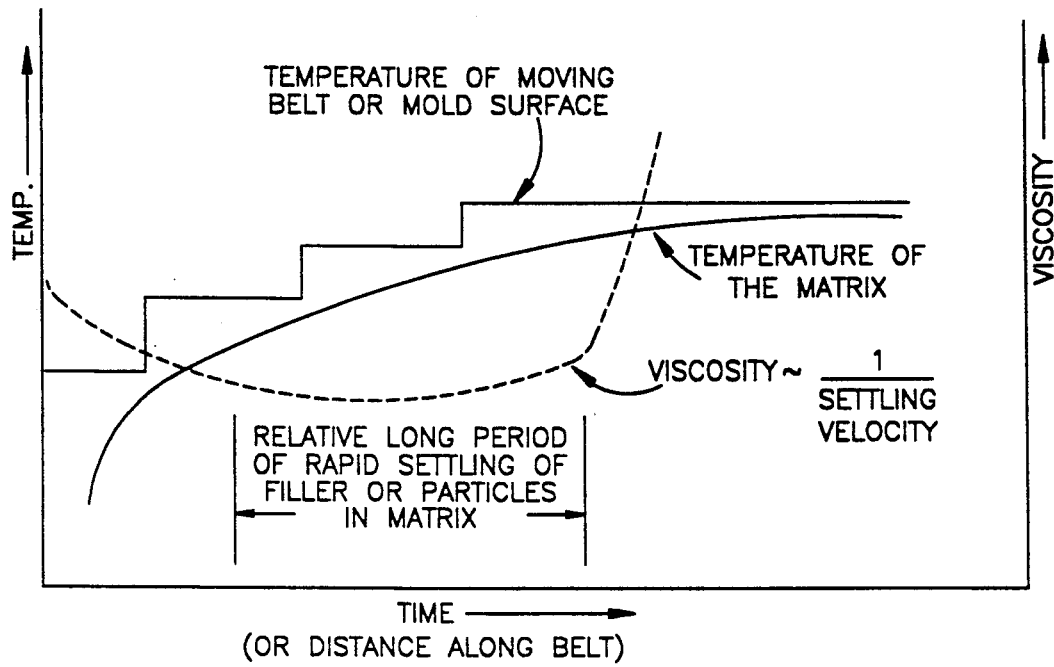
FIG. 3 is a diagram showing the relationship between the settling of the filler and the heating time of the matrix prior to the gelling in a conventional heating arrangement using conductive or convective heating.
Figure 4:
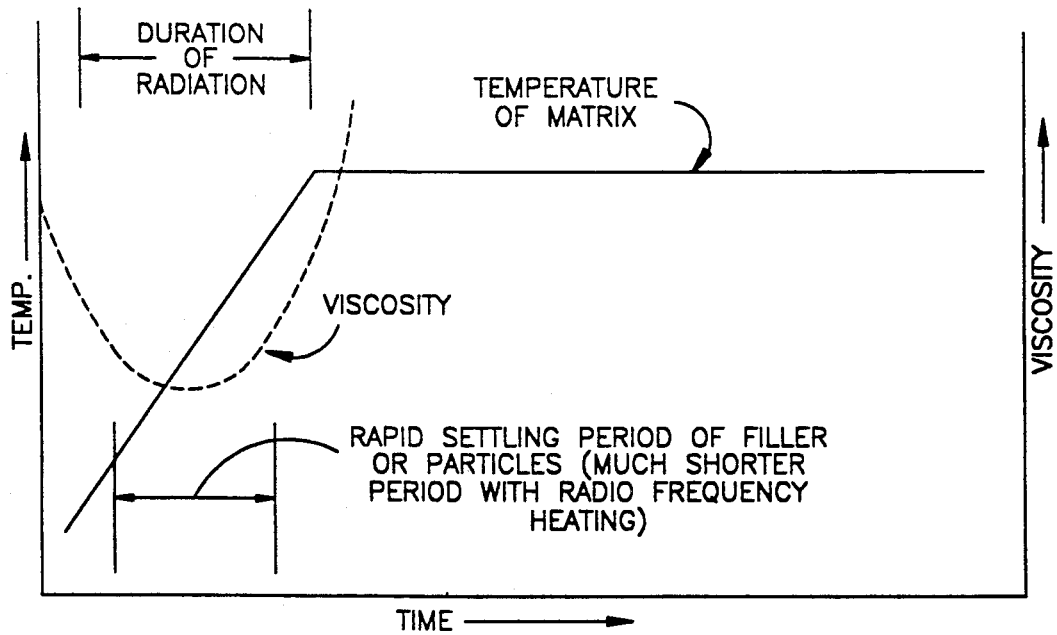
FIG. 4 is a diagram showing the improved relationship between settling of the filler and the shortened heating time made possible by the improved method of the present invention.

One embodiment of an apparatus according to the present invention is shown in FIG. 2. The casting apparatus of FIG. 2 may be divided into two general sections for purposes of discussion. The first is a section in which the matrix is cast and initially gelled. The second is a section in which the matrix is fully polymerized and cooled. These sections are divided by a means which serves to isolate the transmission of mechanical stresses resulting from matrix shrinkage from the gelling stage of the process.

Viewed from left to right, the present invention provides an unwind roll 2 which carries a web 4 upon which the matrix is cast. In one embodiment, this web consists of a release coated roll of paper, but it could be any manner of traveling surface such as a properly treated conveyer belt. To the right of the roll 2 there is provided a conveyor platform 6 which runs the entire length of the first section of the apparatus. The conveyor platform 6 provides a surface across which web 4 is pulled in the casting process. The conveyor platform 6 in one embodiment consists of a sequence of flat support surfaces made of sheet metal or other material suitable to the environment. The portion of the surface in the radio frequency cavities described below naturally must be made of a radio wave transparent material such as plate glass, polypropylene, glass reinforced silicon resin and others.

At the entrance end of the conveyor platform, there is provided an apparatus for folding sharply upright the edges of the paper web 4 to form vertical edges of a predetermined height. This causes web 4 to take the form of a continuous pan. It will be obvious to those skilled in the art that other means could be used to provide appropriate edges to the web to retain the matrix. Downstream of the folding apparatus there is provided a casting head 8 for the liquid matrix. Downstream from the casting head 8 there is provided a conventional radio wave interference choke 10 which prevents the radio frequency energy from leaking out into the room. The interference choke 10 is attached to a first heating cavity 12. As mentioned above, in the region of the heating cavity 12 the conveyor platform 6 is constructed of a radio wave transparent plate. The heating cavity 12 is appropriately blanketed with inert gas through inlet 14 to avoid the possibility of igniting flammable gases due to the potential electrical arcing.

To the exit side of the heating cavity there is provided an exit interference choke 16. Adjacent to the exit interference choke 16 there is provided a first isothermal soaking chamber 18. This is constructed such that the temperature of the environment surrounding the matrix is uniform on all sides, including the bottom which has a heating duct below the conveyor platform 6.

Just beyond the exit end of the first isothermal soaking chamber 18, a series of non-driven rollers 20, 22 and 24 is provided beneath the platform 6 in a configuration which draws the web 4 away from the gelled matrix. In the region where the matrix and web are separated, there is provided a traveling saw 26.

Downstream of the traveling saw 26, there is provided a second section of conveyor platform 28. Just beyond the second section of conveyor platform 28, there is provided a second radio wave interference choke 30 adjacent a second heating chamber 32. Again, the heating chamber 32 is appropriately blanketed with inert gas through inlet 34. At the exit side of the second heating chamber 32 there is provided an exit interference choke 36. Adjacent to the exit interference choke 36, a second soaking chamber 38 is provided. Downstream of the second soaking chamber 38, there is a cooling section.

In the preferred embodiment, operation of the apparatus of the present invention proceeds as follows. A release coated paper sheet 4 is pulled from the roll 2 and threaded through the entire length of the equipment line to the motorized rewind roll 40. As the web 4 advances, just prior to the entrance to the casting section, the edges of the web 4 are folded sharply upright to form a moving trough with vertical edges.

A liquid matrix 42 as described above is pumped at a constant flow rate through the casting head 8 onto the moving web 4. The relationship among the matrix flow rate, the web velocity and the web width establishes the average thickness of the liquid matrix 42. The web 4 advances a sufficient length to allow the liquid matrix 42 to flow to a level surface. The web 4 then enters the first heating cavity 12 through the interference choke 10. In that heating cavity 12, the liquid matrix is heated to a first temperature selected to activate the lower temperature catalyst group and cause polymerization to a gel state without causing premature initiation of the other catalyst group(s) or a strongly exothermic reaction and without causing shrinkage that can cause the carrier web to ripple or wrinkle before it is peeled off by rolls 20, 22 and 24.

Web 4 then advances through exit interference choke 16 and through isothermal soaking chamber 18 which is maintained at the same first temperature throughout its length. In this manner, the combination of starting resin, catalyst, first heating temperature and rate of advance of the web can be adjusted to provide a firm rubbery gel exiting the soaking chamber 18 which gel has not yet undergone excessive shrinkage.

The gelled matrix sheet 42 carried on the web 4 emerges from soaking chamber 18 into the isolation section. There, the web 4 is peeled from the bottom of the matrix sheet 42. Then traveling saw 26, whose machine directional velocity is carefully synchronized with the web 4 velocity, makes a transverse cut through the matrix 42. This separation by cutting is a preferred method of physically isolating the delicate and deformable portions of the gelled matrix from shrinkage stresses produced in the downstream curing step. Those skilled in the art will recognize that other methods of providing physical isolation are also possible.

In this embodiment, the individual gelled sheets 44 are redeposited on the moving web 4. The web 4, now loosely supporting the gelled sheets 44, advances into the second heating cavity 32. Here the gelled sheet 44 is heated to a second temperature that activates the remaining catalyst. This initiates a reaction of the partially polymerized resin which, as described below, is carried out approximately adiabatically. The polymerization causes the temperature of the gelled matrix 44 to rapidly increase to a peak value. This peak value depends on the degree of polymerization when the reaction begins, the concentration of resin in the matrix and the heat capacity of the matrix.

The rapidly curing matrix 44, after exiting choke 36, enters the soaking chamber 38. This chamber 38 is maintained at approximately the same temperature as the expected peak temperature of the exothermic curing reaction in order to provide an adiabatic reaction environment. That is, since the surrounding gas and supporting members in the chamber 38 are held to the same temperature as the expected peak of the curing matrix sheet 44, the matrix effectively is in thermal isolation from its environment during this soaking and polymerization process. This provides a uniform temperature profile in all directions, uniform cross-sectional shrinkage and minimization of warps, waviness and unbalanced stresses.

The present invention relies, in part, upon certain relationships in the shrinkage and polymerization properties of thermosetting resin materials and their catalysts systems discovered to be advantageous in the continuous casting of thermosetting materials. Various materials were used in the work reported and the materials of the present invention are characterized as follows but are not meant to be limited by the following description. Those skilled in the art will recognize the various classes of thermosetting materials which can be used in accordance with the present invention.

Polyester Resin

An unsaturated polyester casting resin is prepared by a condensation reaction of dihydric alcohol and dibasic acids. The viscous reaction products are then dissolved in vinyl or acrylic monomers such as styrene, vinyl toluene or methyl methacrylate (MMA). The resins used contained about 30% styrene monomer, about 0–15% MMA monomer and have a viscosity of about 500 to 2,000 cp at 20 degrees C.

These resins typically contain a small amount of inhibitor, such as hydroquinone to prevent premature gelling during storage. They also typically contain antioxidants and UV absorbers to help control aging and UV degradation of the cured parts which cause yellowing, embrittlement and other physical deterioration.

The specific resins used are purchased from commercial resin suppliers and their exact composition is proprietary to the supplier. However, those found particularly well suited to be adapted for use in the present invention have the following characteristics: (1) They can be polymerized to a thermosetting state by a free radical reaction initiated by catalysts; and (2) The density of the cured resin is substantially higher than the liquid resin, i.e., the resin shrinks during curing. According to published and measured densities, the unfilled resin typically can shrink up to about 15% during polymerization of polyester and up to about 20% in the case of unfilled acrylic resin. The mixtures of resin and filler used (about 35% resin and 65% mineral filler) typically increase in density about 5–8% from the liquid matrix to the final cure. Thus, if the shrinkage occurs isotropically, i.e., the same amount in each direction, a volume shrinkage of 7% would be caused by linear shrinkage of 2.44%. Lower filler rates will have correspondingly higher shrinkage.

In the case of a mineral-filled resin matrix in which the filler has a substantial heat capacity, much of the free energy change during polymerization results in an increased temperature of the filler as well as the resin. The resins most preferably adapted for the present invention should be curable in a reasonably short period during which the final cure is conducted in an essentially thermally isolated environment without the internal heat of reaction causing enough temperature rise to cause thermal degradation of the polymer.

Aluminum Trihydrate (ATH)

Aluminum Trihydrate (ATH) is a naturally occurring mineral derived from processing of bauxite ore used in the manufacture of aluminum metal. Its molecular formula is $Al_2O_3 \cdot 3H_2O$, and in its pure, refined state, it is an almost white to yellowish granular solid. In a finely ground form, ATH has been widely used as a filler in plastics to improve fire resistance. It is most useful when ground to an average particle size below about 30 microns, but not too much below about 5 microns. The low practical limit of particle size is set by the viscosity of the resin - ATH matrix That is, as the ATH particle size is reduced, its higher surface area results in increased viscosity of the matrix, making it less suitable in the present invention. At above about 20–50,000 cp, it becomes very difficult to process, pump and pour the matrix. With a desired mixture of 65% ATH, 35% resin, this viscosity range occurs with ATH particle size of about 10–20 microns depending on the processing conditions and the particular brand of ATH. The high practical limit of particle size would be determined by its settling rate and thus is dependent on the concentration in the resin and the gel time of the matrix. For 65% ATH, 35% resin mixtures, it is preferable in the present invention that particle size not exceed about 30 microns.

The preferred filler ratios are from about 40% to about 85%, and the more preferred ratio is from about 50% to 65%, the lower ratio, of course, being the most difficult relative to heat of reaction. The lower preferred ratio of ATH is approximately the minimum concentration that still provides good fire-hazard characteristics suitable for building applications, but lower ratios could be used if fire resistance is of no concern, or if other means are used to provide fire resistance.

"HI-POINT 90" (Witco Chemical Co.)

Methyl ethyl ketone peroxide (MEKP) is a catalyst typically used to initiate free radical reactions in polyester resins. When it is used alone in the resin, it begins to decompose at a fairly high temperature above 200° F. When used with a small amount of metal maphthenate or octoate, however, MEKP reacts at lower temperatures. Thus, polyester resin containing about 1–2% of MEKP, and about 0.04% copper maphthenate has been found to gel in about 30–60 minutes at 80° F., and in about only 5 minutes at 150° F. It is supplied as a 50% active mixture dissolved in dimethyl phthalate.

"USP-245" (Witco Chemical Co.)

2,5-dimethyl-2,5 bis (2-ethyl-hexanoyl peroxy hexene) is a liquid catalyst that decomposes rapidly in polyester resin at about 180° F. It is supplied as a 90% active mixture.

"PERCADOX 16" (AKZ0 Chemicals Inc.)

Di-(4-t-butyl-cyclohexyl)-peroxy dicarbonate is a powder that dissolves in styrene monomer, and decomposes rapidly in the resin at about 110° F. It has been found to produce a gel time of 4–8 minutes at 150° F. and thus can be used as an alternative to the combination of MEKP and cobalt maphthenate. It is supplied as an 100% active ingredient. In the present invention, this is a preferred low temperature catalyst.

"TRIGONOX C" (AKZO Chemicals Inc.)

t-butyl peroxide benzoate is a liquid that decomposes rapidly in polyester at about 250° F. It is supplied as an 100% active ingredient. In the present invention, this is a preferred high temperature catalyst.

EXAMPLES

Aspects of the present invention are shown by the following examples for purposes of illustration. These examples and embodiments are not meant to limit the invention in any way. Those skilled in the art will recognize that changes, additions and modifications may be made, all within the spirit and scope of the invention.

EXAMPLE 1

A. A matrix mixture is pepared as follows:

| | |
|---|---|
| Unsaturated polyester resin | 30.4 parts |
| Cobalt maphthenate promoter (12% active) | 0.1 parts |
| Methyl methacrylate monomer | 4.6 parts |
| ATH powder | 65.0 parts |
| Methyl ethyl ketone peroxide catalyst (50% active) | 1.41 parts |
| "USP-245" catalyst (90% active) | 0.35 parts |

The resin, the MMA monomer containing the cobalt promoter and the ATH are mixed under vacuum to obtain a uniform mixture of about 6–12,000 cp, free of air bubbles. The last two catalysts are added and stirred until uniformly dispersed. A silicon resin-coated paper is folded into the shape of a tray about 8"×8"×1" high, with the corners taped together and with the release surface inside the pan. The paper tray is placed in a polypropylene pan of a size that provides support to the upfolded edges of the paper tray. The matrix is poured into the paper tray to form a layer about ¼" thick. The matrix filled tray and support pan are then placed in a 600-watt microwave oven.

The oven is energized for a long enough time so that the matrix temperature rises after several minutes to 180 degrees F, at which point the oven is turned off. After about 5 minutes, the temperature of the gelled matrix exceeds 250° F., caused by the exothermic reaction. The matrix is allowed to cure for 35 minutes and then removed from the paper tray. It is observed that the cured part is smaller than the original size of the tray. The bottom surface of the cured matrix and the bottom paper surface of the paper tray are both severely wrinkled due to shrinkage of the matrix while adhering to the paper.

EXAMPLE 2

Experiment 1 is repeated except that the microwave oven is turned off at a time when the matrix temperature reaches about 140-150 degrees F. After about 7 minutes it is found that the matrix is gelled sufficiently to be handled and can be pulled from the paper. It is immediately returned to the paper, placed back in the oven and heated to above 180 degrees F to complete the cure, again in about 35 minutes. This cured, shrunken part is removed from the tray. It is found to have a smooth bottom surface, free of wrinkles. The paper tray also is free of wrinkles. Little or no machining or sanding is required to provide a flat, smooth surface.

EXAMPLE 3

A. A liquid matrix mixture is prepared as follows:

| | |
|---|---|
| Unsaturated polyester resin | 38.9 |
| Cobalt maphthenate promoter | 0.6 |
| ATH powder | 58.3 |
| | 97.8 |

The above mixture is mixed at high shear under vacuum until a uniform mixture is obtained free of air bubbles and has a viscosity of about 10,000 cp. The mixture is pumped at a steady rate of 22.2#/minute into a continuous mixer to which is introduced 0.178#/minute of a catalyst mixture:

| | |
|---|---|
| MEKP | 58.9% |
| "LUPERSOL 224" | 29.5% |
| "USP-245" | 11.69% |

This provides a concentration of catalyst in the resin fraction of the matrix of about 2.1%. This mixture is cast from a slot onto a moving paper web, as described above in connection with FIG. 2, with folded edges 32 in. apart and moving at 2.0 ft/minute. This results in a liquid layer having an average thickness of about 0.50 inches.

The energy output of the first microwave heating cavity is set at about 32 KW. The matrix temperature exceeds 180 degrees F at the end of the first heating cavity—a temperature which exceeds the activation temperature of the "USP-245" catalyst. The hardened sheet emerges from the first cavity with the bottom surface badly wrinkled, as is the carrier paper when it is peeled from the cured plastic sheet. It is observed that the resin is shrunk with the matrix still adhered to the carrier web, resulting in a badly wrinkled bottom surface. It is observed that the finished sheet that emerged from the end of the second heating zone is badly warped and contains cracks and tears, mostly oriented in the machine direction.

EXAMPLE 4

Example 3 is repeated except that the microwave energy is reduced to the point where the average temperature of the sheet exiting the first heating cavity is about 150 degrees F. It is observed that the material emerging from the first cavity is slightly soft to the touch but solid enough to handle. As the paper is peeled from the bottom of the rubbery matrix sheet, it is observed to be relatively smooth and free of wrinkles. Just after the paper is peeled from the gelled matrix sheet, the sheet is cross-cut by the traveling saw, and the resulting section is redeposited on the moving paper. It then travels through the second heating cavity, the curing oven and through a cooling zone. In the second heating cavity, the plastic sheet is heated to about 250 degrees F.

The finished cooled plastic sheet is observed to have a smooth bottom surface. It also is also observed to have a series of lengthwise parallel peaks and valleys on the upper surface, with the peaks as much as about 60-70 mils higher than the troughs. Also, the finished sheet is substantially curled in the cross-machine direction, indicating that the sheet developed stresses during curing. The cross-machine direction spacing of the ridges is observed to correspond to "hot spots" in the first heating cavity, which locally heat the liquid matrix to a temperature above 180 degrees F, even though the average temperature is only about 150 degrees F. These localized temperatures are observed to be above the rapid decomposition point of the higher temperature catalyst.

EXAMPLE 5

Metal panels hinged at their top are hung about 2" away from each vertical wall of the microwave cavity and parallel to each corresponding wall. Means are provided to swing the bottom of each panel back and forth in an arc about 4" long. When the panels are in motion, the radio wave nodes caused by multiple internal reflections are caused to move in a random pattern.

The formulation and running conditions of Example 4 are repeated, once with the panels still and once with the panels moving. In each case, a cross-machine direction temperature profile of the gelled matrix is recorded as it emerges from the heating cavity. The cured sheets, after cooling, are examined for the ridges described in Example 4.

With the panels not moving, the cross-machine direction temperature profile is observed to have peaks and valleys with an amplitude of about 70 degrees F. The cured sheets contain severe ridges about the same as in Example 4. When the panels are caused to reciprocate at a rate of about 15-20 times/minute, the amplitude of the temperature profile is about 15 degrees F, and the severity of the ridges in the cured sheets is sharply diminished. However, the sheets still have substantial curl in the cross machine direction.

EXAMPLE 6

A matrix is prepared using the formulation of Example 2, but with a catalyst mixture as follows:
20% "PERCADOX-16"
1% "TRIGANOX-C"
89% Styrene When this catalyst mixture is added at a rate of 0.263% "PERCADOX" fraction on the resin fraction of the liquid matrix, the low-temperature catalyst "PERCADOX-16" provides a gel time of about 30 minutes at 130 degrees F, 7-8 minutes at 150 degrees F and about 2-3 minutes at 170 degrees F. The "TRIGANOX-C" is a higher temperature catalyst that does not rapidly decompose until about 250 degrees F.

When the matrix formula of Example 3 is cast using this catalyst system, the following data is obtained.

| | |
|---|---|
| Temperature exiting first radio wave cavity | 160 degrees F. |
| Exotherm temperature rise at end of soaking oven | 60 degrees F. |
| Linear shrinkage of gelled matrix just prior to peeling off paper carrier and the saw. | 0.7% |

The finished sheet is observed to be smooth on the bottom.

Further experiments are conducted to observe the changes in shrinkage and the resulting product. The concentration of the "PERCADOX-16" is varied in steps as shown in the following table:

| "PERCADOX-16", % BASED ON LIQUID RESIN FRACTION OF MATRIX | PERCENT ACTIVE OXYGEN OF CATALYST BASED ON LIQUID RESIN FRACTION OF MATRIX | SHRINKAGE, % LINEAR DIMENSION, JUST PRIOR TO THE SAW | GEL TEMP. °F. |
|---|---|---|---|
| 0.135 | 0.0051 | 0.65 | 180 |
| 0.108 | 0.0041 | 0.50 | 180 |
| 0.094 | 0.0036 | 0.40 | 172 |
| 0.081 | 0.0031 | 0.20 | 172 |
| 0.052 | 0.0020 | 0.0 | 172 |
| 0.044 | 0.0017 | 0.0 | 174 |
| 0.035 | 0.0013 | 0.0 | 180 |
| 0.052 | 0.0020 | 0.0 | 180 |
| 0.052 | 0.0020 | 0.1 | 185 |

As the "PERCADOX-16" is reduced, it is necessary to increase the energy output of the first heating cavity to ensure that the matrix gels before emerging from the soaking oven. The following data is obtained using about 0.04% on the resin:

| | |
|---|---|
| Temperature exiting radio wave cavity | 170 degrees F. |
| Exotherm temperature rise at end of soaking oven | 120 degrees F. |
| Linear shrinkage of gelled matrix just prior to peeling off paper carrier | 0% |

The matrix emerging from the gel oven has a rubbery consistency and very little surface ripple. It is observed that the rubbery gelled matrix is free of significant shrinkage and tough enough to be peeled from the carrying web and cut into pieces before further curing and shrinkage.

EXAMPLE 7

In the previous examples, the ambient temperature of the second cavity is set such that its temperature is equal to the temperature of the sheet as it emerges from the second heating cavity. For example, if the energy output of the second heating cavity, plus the heat of reaction of the polymerization initiated in the second cavity, causes the curing sheet to peak at 250° F., the gas temperature and the walls of the second cavity are set at 250° F. With this condition, and using the gel zone conditions of Example 6, the cured sheet is essentially flat and free of significant stresses after cooling.

In example 7, the bottom base plate of the cure oven is raised about 50° above the peak adiabatic temperature of the sheet. In this condition, the cured sheet has a pronounced curl toward the upward face. Next, the bottom base plate of the cure oven is lowered about 50° below the peak adiabatic temperature. In this condition, the cured sheet has a pronounced curl toward the bottom face.

The foregoing description of a preferred embodiment alternate embodiments and examples of the invention have been presented for purposes of illustration and description. The description is not intended to be exhaustive or to limit the invention to the precise form disclosed. Obviously, many modifications and variations are possible in light of the above teaching. The embodiments and examples presented above were chosen and described in order to best explain the principles of the invention and its practical application to thereby enable others skilled in the art to best utilize the invention in various embodiments and with various modifications as are suited to the particular use contemplated.

What is claimed is:

1. A method of continuous casting of a polymerizable material which shrinks upon curing, comprising the steps of:

(a) mixing said material with a first catalyst group having a lower activation temperature and a second catalyst group having a higher activation temperature to form a mixture;

(b) depositing at least one liquid layer of said mixture on an entry end of an open web moving at a predetermined speed to provide a moving layer of said mixture;

(c) heating said moving mixture in a first region to a first temperature at least equal to said lower activation temperature whereby said moving mixture partially polymerizes to a first non-liquid state without excessive shrinkage;

(d) providing conditions for said moving layer of said mixture to increase in temperature in a second region to a second temperature above said higher activation temperature whereby shrinkage occurs substantially uniformly in all directions in said mixture; and (e) Manipulating said layer of said mixture to prevent shrinkage parallel to said web movement from transmission to the portion of said mixture resting on said web in the vicinity of said first region, thereby preventing said shrinkage from damaging said material.

2. The method according to claim 1 further comprising the step of detaching said non-liquid mixture from said web after said step of heating said mixture to a first temperature.

3. The method according to claim 1 wherein said step or providing temperature increase conditions comprises the steps of heating to a second temperature above said higher activation temperature and holding said mixture at approximately said temperature until shrinkage is substantially complete.

4. The method according to claim 2 wherein said step or providing temperature increase conditions comprises the steps of heating to a second temperature above said higher activation temperature and holding said mixture at approximately said temperature until shrinkage is substantially complete.

5. The method according to claims 1, 2, 3 or 4 wherein said higher activation temperature is at least 10 degrees fahrenheit greater than said lower activation temperature.

6. The method according to claims 1, 2, 3 or 4 wherein said step of providing temperature increase conditions comprises the steps of heating to a second temperature above said higher activation temperature and holding said mixture at approximately said second temperature at least until shrinkage of said material is substantially complete.

7. The method according to claim 6 wherein said second temperature is approximately the peak temperature generated under adiabatic conditions by the polymerization reaction during said second heating.

8. The method according to claim 6 wherein the quantity of said first catalyst group is an amount sufficient to polymerize said material to a gel before it has reached the location of said shrinkage transmission prevention step but less than the amount which will produce excessive shrinkage before said location.

9. The method according to claim 8 wherein said first catalyst group comprises, as a percent active oxygen of catalyst, about 0.0010% to about 0.02% of the liquid resin fraction of said material.

10. The method according to claim 5 wherein said first catalyst group has an activation temperature in the range of approximately 100 to 220 degrees fahrenheit.

11. The method according to claim 5 wherein said second catalyst group has an activation temperature in the range of approximately 110 to 280 degrees F.

12. The method according to claim 1 wherein said heating is applied substantially uniformly throughout the cross-section of said mixture whereby a substantially uniform temperature gradient is maintained in said mixture.

13. The method according to claim 12 wherein said heating comprises irradiating said mixture with radio frequency energy.

14. The method according to claim 13 wherein said radio frequency energy is projected in a uniform pattern whereby energy concentrations are substantially dispersed.

15. The method according to claim 5 wherein said first catalyst group and said second catalyst group comprise the same catalyst type and said first catalyst group further includes a promoter.

16. An apparatus for continuous casting of a polymerizable material which shrinks upon curing, comprising:

(a) a mixer suitable to combine said material with a first catalyst group having a lower activation temperature and a second catalyst group having a higher activation temperature;

(b) a casting head adapted to deposit at least one liquid layer of said mixture on an entry end of an open web moving at a predetermined speed to provide a moving layer of said mixture;

(c) a heater suitable to heat said moving mixture to a first temperature at least equal to said lower activation temperature whereby said moving mixture polymerizes to a first non-liquid state without excessive shrinkage;

(d) a chamber adapted to increase the temperature of said moving mixture to a second temperature at least equal to said higher activation temperature whereby shrinkage occurs substantially uniformly in all directions in said mixture; and (e) a mechanical isolator adapted to substantially prevent shrinkage parallel to said web movement from transmission to the mixture resting on the web in the vicinity of said first heater, thereby preventing said shrinkage from damaging said material.

17. An apparatus according to claim 16 further comprising means for detaching said non-liquid mixture from said web after said heating of said mixture.

18. An apparatus according to claim 16 wherein said heater comprises a means for irradiating said mixture with radio frequency energy.

19. An apparatus according to claim 18 wherein said radio frequency energy is projected in a uniform pattern whereby energy concentrations are substantially dispersed.

* * * * *